(12) United States Patent
Chang et al.

(10) Patent No.: US 9,859,783 B1
(45) Date of Patent: Jan. 2, 2018

(54) VOLTAGE CONVERTER CONTROLLER AND VOLTAGE CONVERTER CIRCUIT

(71) Applicant: RICHTEK TECHNOLOGY CORP, Hsinchu County (TW)

(72) Inventors: Yu-Lun Chang, Hsinchu Country (TW); Yuan-Wen Hsiao, Hsinchu County (TW); Jian-Rong Huang, Hsinchu Couny (TW)

(73) Assignee: RICHTEK TECHNOLOGY CORP, Hsinchu County (TW)

( * ) Notice: Subject to any disclaimer, the term of this patent is extended or adjusted under 35 U.S.C. 154(b) by 0 days.

(21) Appl. No.: 14/075,432

(22) Filed: Nov. 8, 2013

(30) Foreign Application Priority Data

Aug. 7, 2013 (TW) .............................. 102128340 A

(51) Int. Cl.
*G05F 1/569* (2006.01)
*H02M 1/088* (2006.01)
*H02M 3/156* (2006.01)
*H02M 1/00* (2006.01)

(52) U.S. Cl.
CPC .......... *H02M 1/088* (2013.01); *H02M 3/156* (2013.01); *H02M 2001/0048* (2013.01)

(58) Field of Classification Search
CPC .......... G05F 1/569; G05F 1/571; G05F 1/575; G05F 3/16; H02M 2003/1566; H02M 3/155; H02M 3/1582; H02M 2003/1557; H02M 3/157; H02M 3/156; H02M 3/158
USPC .................. 323/276, 282–285, 311, 312
See application file for complete search history.

(56) References Cited

U.S. PATENT DOCUMENTS

| 9,628,072 B2* | 4/2017 | Toshiyuki | H03K 17/567 |
|---|---|---|---|
| 2002/0089321 A1* | 7/2002 | Matsuda | H02M 1/38 |
| | | | 324/142 |
| 2002/0113581 A1* | 8/2002 | Eagar | H02M 1/32 |
| | | | 323/282 |
| 2007/0139109 A1* | 6/2007 | Honda | H03F 1/305 |
| | | | 330/251 |
| 2011/0012577 A1* | 1/2011 | Wang | H02M 1/38 |
| | | | 323/283 |
| 2012/0229063 A1* | 9/2012 | Yokokawa | H02P 9/48 |
| | | | 318/400.07 |
| 2012/0229065 A1* | 9/2012 | Yokokawa | H02P 9/48 |
| | | | 318/400.13 |
| 2015/0256074 A1* | 9/2015 | Biondi | H02M 1/38 |
| | | | 323/271 |

(Continued)

*Primary Examiner* — Adolf Berhane
(74) *Attorney, Agent, or Firm* — Chun-Ming Shih; HDLS IPR Services

(57) ABSTRACT

A voltage converter controller, adapted to a voltage converter circuit, includes a power switch controller and a dead-time determining circuit. The power switch controller receives a PWM signal and outputs a high-side control signal and a low-side control signal accordingly to control the conduction and cut-off of a high-side power switch and a low-side power switch respectively. When the power switch controller starts to control the low-side power switch cut-off, after a first dead-time, the power switch controller starts to control the high-side power switch conducting. The dead-time determining circuit detects a current of the low-side power switch to be larger or smaller than a threshold current when the low-side power switch is conducted, and determines the first dead-time to be a first value or a second value accordingly.

16 Claims, 9 Drawing Sheets

(56) References Cited

U.S. PATENT DOCUMENTS

2015/0311795 A1* 10/2015 Yang .................... H02M 3/156
 323/271
2016/0036433 A1* 2/2016 Toshiyuki ............. H02M 7/538
 327/109

* cited by examiner

US 9,859,783 B1

VOLTAGE CONVERTER CONTROLLER AND VOLTAGE CONVERTER CIRCUIT

CROSS-REFERENCES TO RELATED APPLICATIONS

This non-provisional application claims priority under 35 U.S.C. §119(a) on Patent Application No. 102128340 filed in Taiwan, R.O.C. on 7, Aug., 2013, the entire contents of which are hereby incorporated herein by reference.

BACKGROUND

1. Technical Field

This present invention relates to a voltage converter controller and a voltage converter circuit and, more specifically, to a voltage converter controller and a voltage converter circuit capable of determining a dead-time such that optimized power converting efficiency can be reached or approximated.

2. Description of Related Art

A switching voltage converting circuit, being one kind of voltage converter circuits, converts an input voltage to an output voltage on an output terminal by controlling on-off of power switches to manipulate energy stored in an inductor to provide energy to a load coupling to the output terminal. Hence, the output voltage is maintained constant and a load current is provided to the load. One of the advantages of the switching voltage converting circuit is the high power converting efficiency, and therefore less heat is generated, thereby reducing the complexity in the design of heat dissipation.

FIG. 1 is a circuit block diagram of a voltage converter circuit 100 of prior art, where the voltage converter circuit 100 is a Buck switching voltage converter. The voltage converter circuit 100 includes a voltage converter controller 180, which operates a power switch controller 170 to receive a pulse-width-modulation (PWM) signal 190, which is used to control on-off of a high-side power switch 110 and a low-side power switch 120. Hence, the energy stored in the inductor 130 is manipulated to convert an input voltage on a converting input terminal 140 to an output voltage on a converting output terminal 150 and to provide an output current. The channels of the high-side power switch 110 and the low-side power switch 120 are serially connected to each other and coupled between the converting input terminal 140 and another voltage reference terminal (for example, a ground terminal 160 in FIG. 1). The connecting terminal of the channels of the high-side power switch 110 and the low-side power switch 120, which is a phase terminal 115, is coupled to the inductor 130. In a normal operation, the channels of the high-side power switch 110 and the low-side power switch 120 will not be conducted concurrently to prevent from a shoot-through current flowing from converting input terminal 140 to the ground terminal 160 directly through the channels. The shoot-through current will not only cause degradation on power converting efficiency but also, if a heavy current is drawn, adversely burn the high-side power switch 110 and the low-side power switch 120. Therefore, it should be assured that the low-side power switch can only be turned on after the high-side power switch is turned off. However, in a practical control case, there will always exist a dead-time between the turning-on instant and the turning-off instant of the power switches, at which period the high-side power switch 110 and the low-side power switch 120 are turned off concurrently and the output current flows through the parasitic devices (i.e., the parasitic diodes 111 and 121 in FIG. 1) of the high-side power switch 110 and the low-side power switch 120 to form a current loop.

However, in a real application, the power loss of forming the current loop by conducting either the parasitic diode 111 or the parasitic diode 112 will be larger than that by the conducting channel of either the high-side power switch 110 or the low-side power switch 120. This is because the forward-biasing voltage of a PN junction of a semiconductor device is usually larger than the cross voltage of a conducting channel of a power switch. Therefore on the circuit design, subject to prevention from shoot-through current, the conducting time of parasitic devices, which is related to the dead-time, should be as short as possible to optimize the power converting efficiency.

FIG. 2 is a waveform plot of the voltage converter circuit 100 of prior art. Assume a direction of a current path 122 shown in FIG. 1 is a positive inductor current. FIG. 2 shows related waveforms, in which the power switch controller 170 controls the low-side power switch 120 cut-off and subsequently the high-side power switch 110 conducting when the inductor current is positive. The waveforms 210, 220, 230, and 240 are the voltage waveforms of the PWM signal 190, the control terminal of the low-side power switch 120, the phase terminal 115, and the control terminal of the high-side power switch 110 respectively. As shown in FIG. 2, when waveform 210 toggles at time instant t1, waveform 220 correspondingly toggles at time instant t1', and the channel of the low-side power switch 120 is cut-off at time instant t2. The current path 122 is established at time instant t3 through the parasitic diode 121 and therefore results in a "larger" negative voltage, as shown in waveform 230. At time instant t4' waveform 240 starts to toggle and the channel of the high-side power switch 110 starts to conduct at time instant t4 which causes waveform 230 starts to rise until time instant t5. The time slot formed between time instants t1' and t4' is the dead-time provided by the power switch controller 170 to prevent the channels of the high-side power switch 110 and the low-side power switch 120 from conducting concurrently under any circumstance. However, in response to the dead-time, the parasitic diode 121 conducts between time instants t3 and t4 and contributes to the current path 122, which causes degradation on power converting efficiency.

FIG. 3 is another waveform plot of the voltage converter circuit 100 of prior art. FIG. 3 shows related waveforms, in which the power switch controller 170 controls the low-side power switch 120 cut-off and subsequently the high-side power switch 110 conducting when the inductor current is negative (i.e., less than zero). The waveforms 310, 320, 330, and 340 are the voltage waveforms of the PWM signal 190, the control terminal of the low-side power switch 120, the phase terminal 115, and the control terminal of the high-side power switch 110 respectively. As shown in FIG. 3, when waveform 310 toggles at time instant t1, waveform 320 correspondingly toggles at time instant t1', and the channel of the low-side power switch 120 is cut-off at time instant t2. Meanwhile, the inductor current flows from the converting output terminal 150 to the phase terminal 115, causing waveform 330 starts to rise until the parasitic diode 111 conducts at time instant t3 and the current path 112 is established. Further at time instant t4' waveform 340 starts to toggle and the channel of the high-side power switch 110 starts to conduct at time instant t4. Because the cross voltage of the channel of the high-side power switch 110 is less than that of the parasitic diode 111 when conducting the same current quantity, waveform 330 starts to fall at time instant t4 until time instant t5. The time slot formed between time instants t1' and t4' is the dead-time provided by the power switch controller 170. However, the parasitic diode 121 conducts between time instants t3 and t4 and contributes to the current path 122, which causes degradation on power converting efficiency.

FIG. 4 is still another waveform plot of the voltage converter circuit 100 of prior art. FIG. 4 shows related waveforms in which the power switch controller 170 controls the high-side power switch 110 cut-off and subsequently the low-side power switch 120 conducting when the inductor current is positive. The waveforms 410, 420, 430, and 440 are the voltage waveforms of the PWM signal 190, the control terminal of the high-side power switch 110, the phase terminal 115, and the control terminal of the low-side power switch 120 respectively. As shown in FIG. 4, when waveform 410 toggles at time instant t1, waveform 420 correspondingly toggles at time instant t1', and the channel of the high-side power switch 110 is cut-off at time instant t2. Meanwhile the inductor current flows from the phase terminal 115 to the converting output terminal 150, causing waveform 430 to fall until the parasitic diode 121 conducts at time instant t3 and the current path 122 is established. Further, at time instant t4' waveform 440 starts to toggle and the channel of the low-side power switch 120 starts to conduct at time instant t4. Because the cross voltage of the channel of the low-side power switch 120 is less than that of the parasitic diode 121 when conducting the same current quantity, waveform 430 starts to rise at time instant t4 until time instant t5. The time slot formed between time instants t1' and t4' is the dead-time provided by the power switch controller 170. However, the parasitic diode 121 conducts between time instants t3 and t4 and contributes to the current path 122, which causes degradation on power converting efficiency.

To optimize the dead-time mentioned above for improving the power converting efficiency, many technical means of prior art are evolved such as detecting voltages on the control terminal of high-side power switch 110, the control terminal of the low-side power switch 120, and the phase terminal 115, so as to determine the dead-time. However, these technical means do not take into consideration that, during the dead-time, different quantity of directions of inductor current can cause different behavior of the voltage change on the phase terminal, such as those shown in FIG. 2 and FIG. 3. Therefore, the optimization on power converting efficiency cannot be reached or even approximated in that way since only single direction of the inductor current can be adapted in the prior optimization methods.

SUMMARY

In view of abovementioned problems, the objective of the present invention is to provide a voltage converter controller and a voltage converter circuit which can optimize the power converting efficiency by determining the dead-time.

In the first embodiment, a voltage converter controller is disclosed. The voltage converter controller is adapted to a voltage converter circuit. The voltage converter circuit operates a high-side power switch and a low-side power switch thereof so as to convert an input voltage to an output voltage through an inductor, where a channel of the high-side power switch, a channel of the low-side power switch, and the inductor are coupled at a phase terminal. The voltage converter controller comprises a pulse-width-modulation (PWM) signal, a power switch controller, and a dead-time determining circuit. The PWM signal indicates the conduction or cut-off of the channel of the high-side power switch and the channel of the low-side power switch. The power switch controller receives the PWM signal and outputs a high-side control signal and a low-side control signal which respectively control the conduction and cut-off of the channel of the high-side power switch and the channel of the low-side power switch, where at most one of the channel of the high-side power switch and the channel of the low-side power switch is conducted concurrently. When the power switch controller starts to control the low-side power switch cut-off, after a first dead-time, the power switch controller starts to control the high-side power switch conducted. The dead-time determining circuit is configured to detect a current of the conducted channel of the low-side power switch to determine a value of the first dead-time. When the current of the conducting channel of the low-side power switch is larger than a current threshold, the first dead-time is determined to be a first value. When the current of the conducting channel of the low-side power switch is smaller than the current threshold, the first dead-time is determined to be a second value. The value of the first dead-time is smaller than that of the second dead-time.

In the second embodiment, a voltage converter circuit, of which the topology is the same as that of the voltage converter circuit described in the first embodiment, is disclosed.

The present invention is advantageous because the voltage converter controller and the voltage converter circuit disclosed can adapt to any inductor current with different quantities and directions so as to determine a dead-time suitable for proper operations of power switches, and therefore optimized power converting efficiency can be reached or approximated.

BRIEF DESCRIPTION OF THE DRAWINGS

These and other objectives of the present invention will no doubt become obvious to those of ordinary skill in the art after reading the following detailed description of the preferred embodiments illustrated in the various figures and drawings, in which.

DETAILED DESCRIPTION OF THE EMBODIMENTS

In the description hereinafter, the term of "coupled" or "coupling" refers to any two objects directly or indirectly electrically connected to each other. Therefore, if it is described that "a first device is coupled to a second device," the meaning is that the first device is either directly electrically connected to the second device or indirectly electrically connected to the second device through other devices or connection means. Besides, "a first logic level" and "a second logic level" mean steady states of digital logic signals, which are usually understood as "1" and "0" in the art. For example, if "the first logic level" is defined as "1," then "the second logic level" is correspondingly defined as "0," and vice versa.

Figure 1:
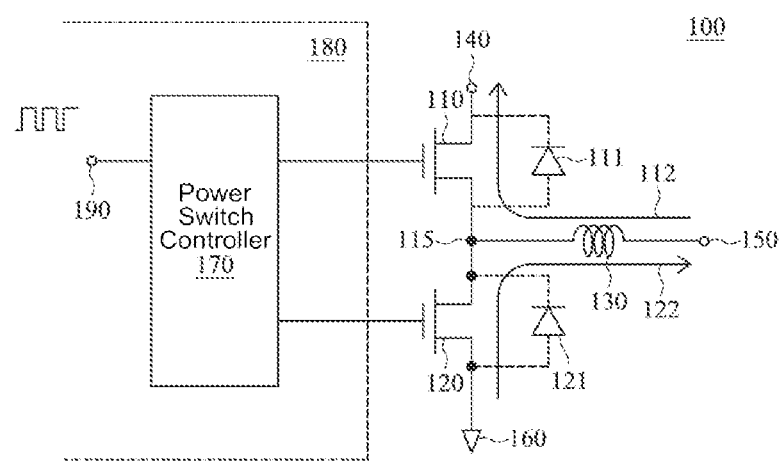
FIG. 1 is a circuit block diagram of a voltage converter circuit of prior art.
Figure 2:
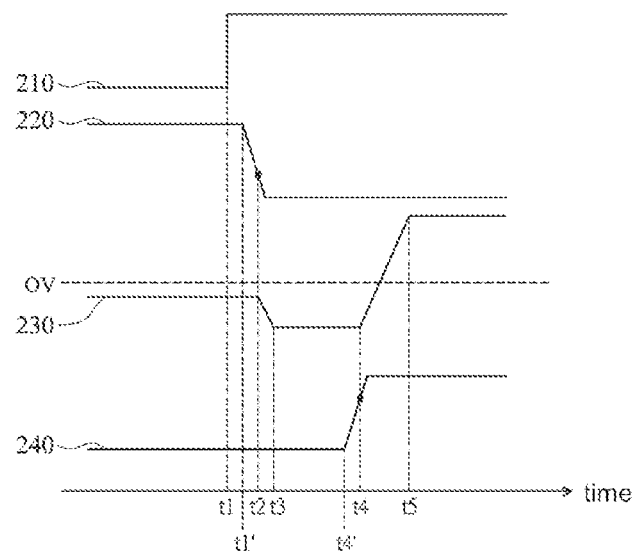
FIG. 2 is a waveform plot of the voltage converter circuit of prior art.
Figure 3:
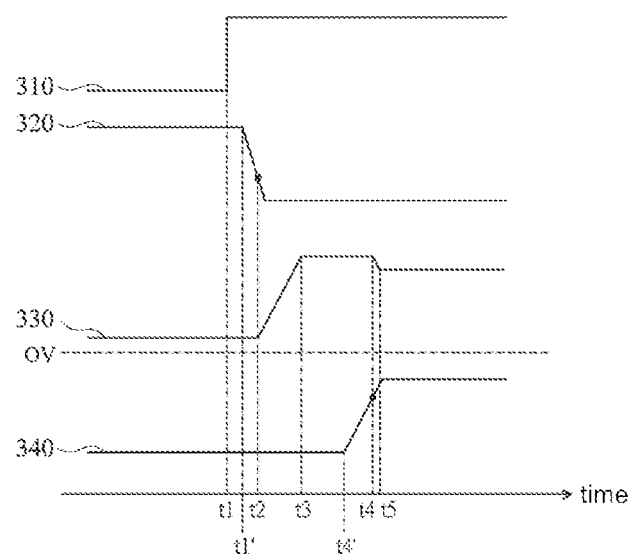
FIG. 3 is another waveform plot of the voltage converter circuit of prior art.
Figure 4:
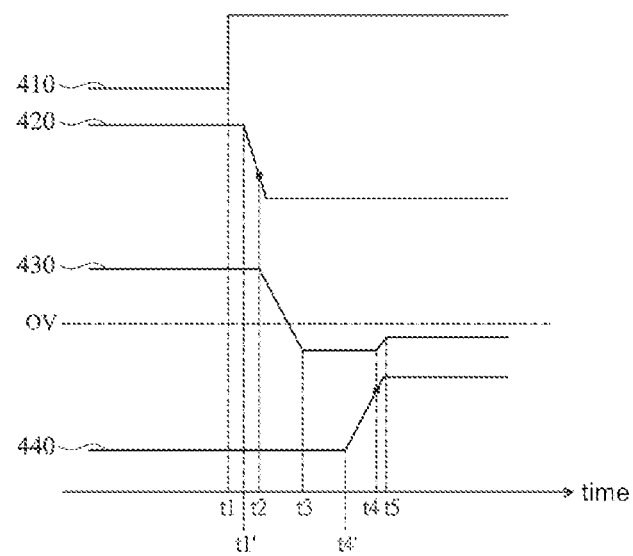
FIG. 4 is yet another waveform plot of the voltage converter circuit of prior art.
Figure 5:
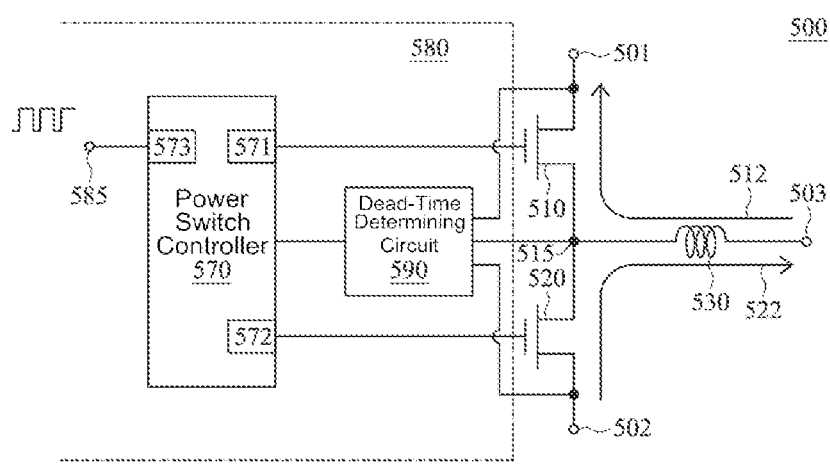
FIG. 5 is a circuit block diagram of a voltage converter controller and a voltage converter circuit thereof of the present invention.

FIG. 5 is a circuit block diagram of a voltage converter controller 580 and a voltage converter circuit thereof, which is the voltage converter circuit 500, of the present invention. The voltage converter circuit 500 operates a high-side power switch 510 and a low-side power switch 520 thereof to convert an input voltage to an output voltage through an inductor 530. A channel of the high-side power switch 510, a channel of the low-side power switch 520, and the inductor 530 are coupled at a phase terminal 515. The voltage converter controller 580 includes a pulse-width-modulation (PWM) signal 585, a power switch controller 570, and a dead-time determining circuit 590.

The PWM signal 585 indicates the conduction and cut-off of the channel of the high-side power switch 510 and the channel of the low-side power switch 520. For example, the PWM signal 585 is a digital logic signal. When the PWM signal 585 is at the first logic level, it indicates the channel of the high-side power switch 510 conducting and the channel of the low-side power switch 520 cut-off. When the PWM signal 585 is at the second logic level, it indicates the channel of the high-side power switch 510 cut-off and the channel of the low-side power switch 520 conducting.

The power switch controller 570 receives the PWM signal 585 through an input terminal 573 and outputs a high-side control signal and a low-side control signal which respectively control the conduction and cut-off of the channel of the high-side power switch 510 and the channel of the low-side power switch 520. During operation, at most one of the channel of the high-side power switch 510 and the channel of the low-side power switch 520 is conducted concurrently. When the power switch controller 570 starts to control the low-side power switch 520 cut-off, after a first dead-time, the power switch controller 570 starts to control the high-side power switch 510 conducting.

The dead-time determining circuit 590 is configured to detect a current of the conducting channel of the low-side power switch 520 to determine a value of the first dead-time. When the current of the conducting channel of the low-side power switch 520 is larger than a current threshold, the first dead-time is determined to be a first value. When the current of the conducting channel of the low-side power switch 520 is smaller than the current threshold, the first dead-time is determined to be a second value. The value of the first dead-time is smaller than that of the second dead-time.

For example, assume a direction of a current path 522 shown in FIG. 5 is a positive inductor current. When the inductor current is larger than the current threshold, the relatively smaller first value is adopted for the first dead-time by which the conduction time of a parasitic diode (not shown in FIG. 5) of the low-side power switch 520 is decreased or even eliminated, and thus the power converting efficiency is improved. On the other hand, when the inductor current is negative, the phase terminal 515 is charged and a voltage thereof starts to rise after the channel of low-side power switch 520 is cut-off. However, since the cross voltage on both sides of the channel of the high-side power switch 510 is relatively larger, the power converting efficiency will be degraded if the channel of the high-side power switch 510 is conducted at this time. Therefore, in such condition the larger second value is adopted for the first dead-time, by which the channel of the high-side power switch 510 is conducted when the cross voltage on both sides of the channel of the high-side power switch 510 approaches zero, and thus the power converting efficiency can be optimized. The above description in which the inductor current is negative is the design concept of zero-voltage switching (ZVS).

Figure 5A:
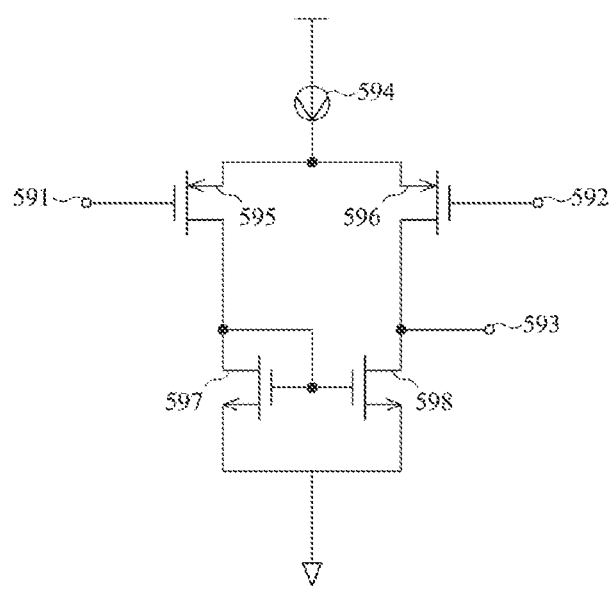
FIG. 5a is a circuit diagram of a comparator of the dead-time determining circuit of the present invention.

Besides, the dead-time determining circuit 590 can further include a comparator for detecting a current quantity of the conducting channel of the low-side power switch 520. FIG. 5a is a circuit diagram of a comparator 5900 of the dead-time determining circuit 590 of the present invention. The comparator 5900 includes two input terminals 591, 592 respectively coupled to both sides of the channel of the low-side power switch 520. A signal on an output terminal 593 of the comparator 5900 is adopted to determine the first dead-time to be the first value or the second value. The comparator 5900 further includes a current source 594 and field-effect transistors (FET) 595, 596, 597, and 598. Under normal operation, the voltages on the input terminals 591, 592 are in the vicinity of zero. Hence, a preferable choice of the FET's 595, 596 is P-type FET's, while that of the FET's 597, 598 is N-type FET's. A control terminal of the FET 595 is coupled to the input terminal 591. A channel of the FET 595 is coupled between the current source 594 and a control terminal of the FET 597. A control terminal of the FET 596 is coupled to the input terminal 592. A channel of the FET 596 is coupled between the current source 594 and the output terminal 593. A control terminal of the FET 597 is coupled to a control terminal of the FET 598. A channel of the FET 597 is coupled between the control terminal of the FET 597 and a ground terminal. A channel of the FET 598 is coupled between the output terminal 593 and the ground terminal.

It is noted that a FET is possible a metal-oxide-semiconductor field-effect transistor (MOSFET), a junction field-effect transistor (JFET), an insulated-gate bipolar transistor (IGBT), or any other semiconductor device with similar physical structure and functions of the above mentioned types of FET devices. Furthermore, a control terminal of a FET means a gate terminal thereof, and a channel of a FET means a channel between a source terminal and a drain terminal thereof.

More specifically, since the cross voltage of the both sides of the conducting channel of the low-side power switch 520 can be a representative of a current quantity on the conducting channel, the above-mentioned cross voltage can be adopted to compare with 0 voltage to determine the polarity of the current on the conducting channel of the low-side power switch 520. That is to say, a comparator with zero comparing threshold, such as the comparator 5900 with matched FET's 595, 596 and matched FET's 597, 598, can be adopted and the value of the first dead-time can be determined according to the comparing result. In this case the current threshold is at zero current.

Moreover, an inherent offset threshold can also be designed in the comparator 5900 by which the current threshold of the dead-time determining circuit 590 is not zero. For example, the design of the FET's 595, 596 is unmatched and/or that of FET's 597, 598 is unmatched, which will induce an inherent effective input offset voltage of the comparator 5900. The comparator can further incorporate an output-input transfer function with hysteresis effect; that is, the comparing threshold is related to an output state of the comparator. Therefore, when the inductor current is approximated to the current threshold, it can be avoided that the value of the first dead-time changes back and forth between the first value and the second value, which could result in system instability. It is worth noting that the design and reference circuit topologies of the comparators mentioned above can be referred to prior art. A proper comparator circuit can be easily designed by people skilled in the art according to requirements in applications after understanding the description of the present invention.

Figure 6:
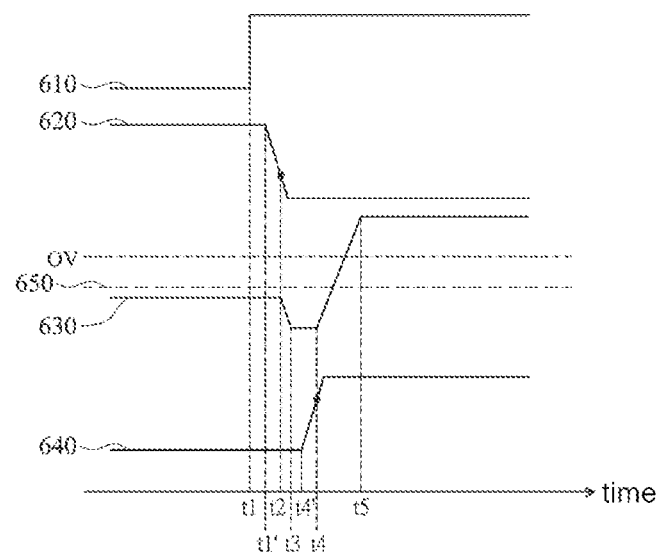
FIG. 6 is a waveform plot of the voltage converter controller and the voltage converter circuit thereof of the present invention.

FIG. 6 is a waveform plot of a voltage converter circuit according to the voltage converter controller 580 and the voltage converter circuit 500 of the present invention. In the case of FIG. 6, the inductor current is positive and larger than the current threshold, and the power switch controller 570 controls the channel of the low-side power switch 520 cut-off and subsequently the channel of the high-side power switch 510 conducting. Waveform 610, 620, 630, and 640 are the voltage waveforms of the PWM signal 585, the control terminal of the low-side power switch 520, the phase terminal 515, and the control terminal of the high-side power switch 510 respectively. The waveform 650 represents a corresponding voltage level of the phase terminal 515 when the inductor current is at the current threshold and the channel of the low-side power switch is conducting. As shown in FIG. 6, when waveform 610 toggles at time instant t1, waveform 620 correspondingly toggles at time instant t1', and the channel of the low-side power switch 520 is cut-off at time instant t2. Therefore, the current path 522 is established through the parasitic diode (not shown) of the low-side power switch 520 at time instant t3 and causes waveform 630 a "larger" negative voltage. At time instant t4', waveform 640 starts to toggle and the channel of the high-side power switch 510 starts to conduct at time instant t4, which causes waveform 630 to rise until time instant t5. The time slot formed between time instants t1' and t4' is the first dead-time, which is the first value, provided by the power switch controller 570. An optimized value for the first value is to render the time instant t2 and t4 the same to prevent the parasitic diode of the low-side power switch 520 from conducting. However, considering the effects such as operating temperature and device aging in practical operations, the first value will vary and the optimized value may not apply to all applications. Hence, a design margin should be considered to prevent the channels of the high-side power switch 510 and the low-side power switch 520 from conducting concurrently.

Figure 7:
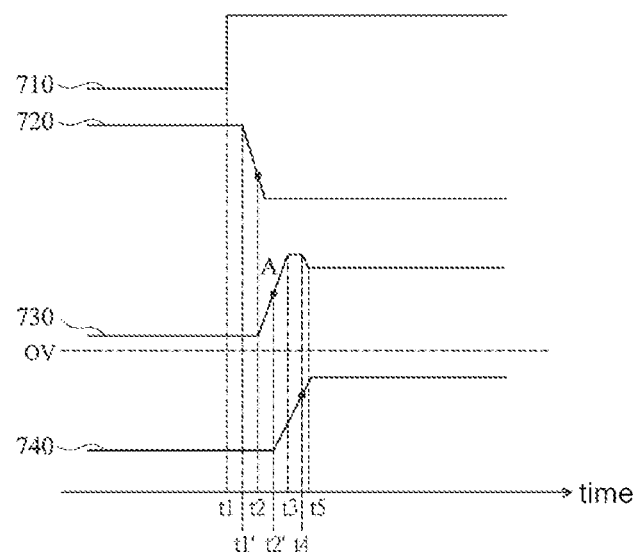
FIG. 7 is another waveform plot of the voltage converter controller and the voltage converter circuit thereof of the present invention.

FIG. 7 is another waveform plot of a voltage converter circuit according to the voltage converter controller 580 and the voltage converter circuit 500 of the present invention. In the case of FIG. 7, the inductor current is negative and the power switch controller 570 controls the channel of the low-side power switch 520 cut-off and subsequently the channel of the high-side power switch 510 conducting. Waveform 710, 720, 730, and 740 are the voltage waveforms of the PWM signal 585, the control terminal of the low-side power switch 520, the phase terminal 515, and the control terminal of the high-side power switch 510 respectively. As shown in FIG. 7, when waveform 710 toggles at time instant t1, waveform 720 correspondingly toggles at time instant t1', and the channel of the low-side power switch 520 is cut-off at time instant t2. Meanwhile the inductor current flows into the phase terminal 115 causing waveform 730 starts to rise until the parasitic diode (not shown) of the high-side power switch 510 conducts at time instant t3 and the current path 512 is established. Further at time instant t4' waveform 740 starts to toggle and the channel of the high-side power switch 510 starts to conduct at time instant t4. Because the cross voltage of the channel of the high-side power switch 510 is smaller than that of the parasitic diode thereof when conducting the same current quantity, waveform 730 starts to fall at time instant t4 until time instant t5. The time slot formed between time instants t1' and t4' is the first dead-time, which is the second value, provided by the power switch controller 570. An optimized value for the second value is to conduct the channel of the high-side power switch 510 to establish the current path 512 before the parasitic diode of the high-side power switch 510 is about to be conducted. Hence, not only the conduction of the parasitic diode mentioned in this paragraph is prevented, but also the conduction of the channel of the high-side power switch 510, on both sides of which when the cross voltage is still large, is also prevented. The operation described above is the design concept of ZVS. However, considering the effects such as operating temperature and device aging in practical operations, the second value will vary and the optimized value may not apply to all applications. It is noted that from the description of FIG. 6 and FIG. 7, the voltage converter controller 580 of the present invention can be adapted to the inductor current with different quantity and directions, thereby reaching or approximating optimized power converting efficiency.

In more detail, in the dead-time period shown in FIG. 7, the rising slope of waveform 730 is positively related to the absolute value of the inductor current. Taking this relation into consideration that, if the second value is a constant, the optimized power converting efficiency will not be reached or approximated since the inductor current varies. To improve the situation, the dead-time determining circuit 510 further detects the cross voltage on both sides of the channel of the high-side power switch 510; that is, after the channel of the low-side power switch 520 starts to be cut-off, if the cross voltage on both sides of the channel of the high-side power switch 510 is smaller than a voltage threshold and the high-side power switch 510 is not conducted yet, then the dead-time determining circuit 590 sends a signal to the power switch controller 570 so as for the power switch controller 570 to control the channel of the high-side power switch 510 conducting. For example, when the voltage on the phase terminal 515, which is waveform 730, rises across a point A, which is corresponding to the threshold voltage mentioned above, the power switch controller 570 controls and renders waveform 740 start to toggle, by which the channel of the high-side power switch 510 will conduct at the time approximating to the optimized time instant. Hence, the voltage converter controller 580 can adapt to varying inductor current such that optimized power converting efficiency is reached or approximated. To realize the design mentioned in the present embodiment, comparator and logic gates should be additionally incorporated into the dead-time determining circuit 590, and both sides of the channel of the high-side power switch 510 should be coupled to the input terminals of the comparator. The design and circuit topology of the comparator can be referred to the comparator 5900 shown in FIG. 5a, and further modification can also be realized to be adopted in different applications. Hence, other proper comparator circuits can be easily designed by people skilled in the art according to requirements in applications after understanding the description of the present invention.

Furthermore, in the voltage converter controller 580 shown in FIG. 5, a similar condition can also be considered when the channel of the high-side power switch 510 is cut-off and subsequently the channel of the low-side power switch 520 is conducted. When the power switch controller 570 starts to control the high-side power switch 510 cut-off, after a second dead-time, the power switch controller 570 starts to control the low-side power switch 520 conducting. And, if the current on the channel of the low-side power switch 520 conducting in the last time is larger than the current threshold, the second dead-time is determined to be a third value. On the other hand, the current of the channel of the low-side power switch 520 conducting in the last time is smaller than the current threshold, and the second dead-time is determined to be a fourth value. For example, in usual applications when the channel of the high-side power switch 510 conducts, the inductor current increases toward the positive current direction. And when the channel of the high-side power switch 510 is about to be cut-off, the inductor current may have become positive. Hence, once the high-side power switch 510 is cut-off, the voltage on the positive phase terminal 515 starts to fall because of the positive inductor current, and the slope of the falling voltage is positively related to the quantity of the inductor current. At this time the aforementioned ZVS operation can be considered to optimize the efficiency. That is to say, when the inductor current is larger, the voltage on the phase terminal 515 falls relatively quicker, and a smaller second dead-time can be set by the power switch controller 570. On the contrary, when the inductor current is smaller, the voltage on the phase terminal 515 falls slower and a larger second dead-time can be set by the power switch controller 570. Hence, the ZVS operation is approximated realized, and the conduction of the parasitic diode can be prevented, or even conducted, the conducting period of the parasitic diode can be limited to a finite time, such that the degradation on power converting efficiency is minimized. The inductor current in this case is positively related to the current on the channel of the low-side power switch 520 conducting in the last time, which can be detected by the dead-time determining circuit 590, compared with the current threshold, and the second dead-time can be determined to be the smaller third value or the larger fourth value.

Figure 8:
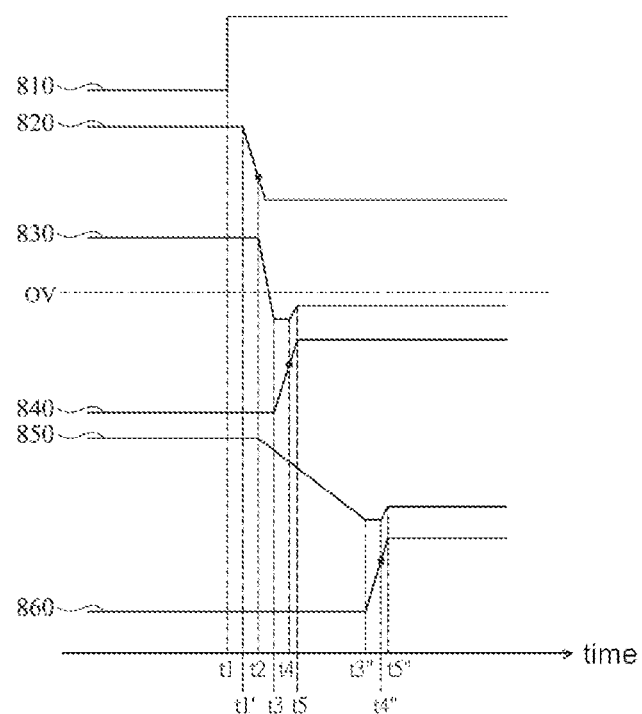
FIG. 8 is yet another waveform plot of the voltage converter controller and the voltage converter circuit thereof of the present invention.

FIG. 8 is still another waveform plot of a voltage converter circuit according to the voltage converter circuit 500 of the present invention. In the case of FIG. 8, the inductor current is positive, and the power switch controller 570 controls the channel of the high-side power switch 510 cut-off and subsequently the channel of the low-side power switch 520 conducting. Waveform 810, 820 are the voltage waveforms of the PWM signal 585 and the control terminal of the high-side power switch 510 respectively. Waveform 830, 840 are the voltage waveforms of the phase terminal 515 and the control terminal of the low-side power switch 520 respectively, when the current on the channel of the low-side power switch 520 conducting in the last time is larger than the current threshold. Waveform 850, 860 are the voltage waveforms of the phase terminal 515 and the control terminal of the low-side power switch 520 respectively, when the current on the channel of the low-side power switch 520 conducting in the last time is smaller than the current threshold. As shown in FIG. 8, when waveform 810 toggles at time instant t1, waveform 820 correspondingly toggles at time instant t1', and the channel of the high-side power switch 510 is cut-off at time instant t2. Meanwhile the inductor current flows from the phase terminal 515 to an output terminal 503 causing waveform 830 starts to fall until the parasitic diode (not shown) of the low-side power switch 520 conducts at time instant t3 and the current path 522 is established. Further, in the vicinity of time instant t3, waveform 840 starts to toggle and the channel of the low-side power switch 520 starts to conduct at time instant t4. Because the cross voltage of the channel of the low-side power switch 520 is smaller than that of the parasitic diode thereof on the condition of conducting the same current quantity, waveform 830 starts to rise at time instant t4 until time instant t5. The time slot formed between the time instant t1' and the time instant when waveform 840 starts to toggle is the second dead-time, which is the third value, provided by the power switch controller 570. An optimized value for the third value is to conduct the channel of the low-side power switch 520 to establish the current path 522 just before the parasitic diode of the low-side power switch 520 is about to be conducted. Hence, not only the conduction of the parasitic diode mentioned in the present embodiment is prevented, but also the conduction of the channel of the low-side power switch 520, on both sides of which when the cross voltage is still large, is also prevented. The operation described above is the design concept of ZVS. However, considering the effects such as operating temperature and device aging in practical operations, the second value will vary and the optimized value may not apply to all applications, and thus a design margin should be considered. On the other hand, on waveforms 850 and 860, since the inductor current is relatively smaller, resulting in slower falling on waveform 850, and the parasitic diode of the low-side power switch 520 is not conducted until t3", and after that, the current path 522 is established. Therefore, if the third value is adopted for the second dead-time in this case, the channel of the low-side power switch 520 will start conducting at time instant t4, where the cross voltage of both sides of the channel of the low-side power switch 520 is still large and thus results in unnecessary power loss, thereby degrading the power converting efficiency. Hence, in the case of waveform 850 and 860, the preferable choice for the second dead-time is the fourth value, by which the channel of the low-side power switch 520 starts to conduct at the time instant t4", and correspondingly waveform 850 starts to rise until t5". From the description of FIG. 8, the voltage converter controller 580 of the present invention can take the operation, which controls the channel of the high-side power switch 510 cut-off and subsequently the channel of the high-side power switch 520 conducting, into consideration so as to adapt itself to varying inductor current. Therefore, optimized power converting efficiency is reached or approximated.

It is worth noting that the voltage converter circuit 500 can be, but not limited to, a Buck switching voltage converter. For example, one terminal of the channel of the high-side power switch 510, which is a terminal 501, receives the input voltage. One terminal of the channel of the low-side power switch 520, which is a terminal 502, is coupled to the ground terminal, and the inductor 530 is coupled to the output terminal 503. In summary, the voltage converter circuit 500 converts the input voltage to a lower output voltage on the output terminal 503 and provides current to the output terminal 503; the voltage converter controller 580 is adapted to the voltage converter circuit 500 to reach or approximate optimized power converting efficiency with varying inductor current.

The aforementioned description represents merely the preferred embodiment of this invention, without any inten-

What is claimed is:

1. A voltage converter controller adapted to a voltage converter circuit, the voltage converter circuit operates a high-side power switch and a low-side power switch to convert an input voltage to an output voltage through an inductor, wherein a channel of the high-side power switch, a channel of the low-side power switch, and the inductor are coupled at a phase terminal, the voltage converter controller comprising:
  a pulse-width-modulation (PWM) signal, indicating the conduction and cut-off of the channel of the high-side power switch and the channel of the low-side power switch;
  a power switch controller, receiving the PWM signal whereby the power switch controller outputs a high-side control signal and a low-side control signal which respectively control the conduction and cut-off of the channel of the high-side power switch and the channel of the low-side power switch, wherein at most one of the channel of the high-side power switch and the channel of the low-side power switch is conducted concurrently, and when the power switch controller starts to control the low-side power switch cut-off, after a first dead-time, the power switch controller starts to control the high-side power switch conducting; and
  a dead-time determining circuit, detecting a current of the conducting channel of the low-side power switch to determine a value of the first dead-time,
    wherein when the current of the conducting channel of the low-side power switch is larger than a current threshold, the first dead-time is determined to be a first value;
    wherein when the current of the conducting channel of the low-side power switch is smaller than the current threshold, the first dead-time is determined to be a second value, and wherein the second value is larger than the first value.

2. The voltage converter controller of claim 1, wherein the voltage converter circuit is a Buck switching voltage converter, and wherein the high-side power switch is coupled to the input voltage, the low-side power switch is coupled to a ground terminal, and the inductor is coupled to the output voltage.

3. The voltage converter controller of claim 1, wherein the dead-time determining circuit further comprises a comparator, two input terminals of the comparator are respectively coupled to both sides of the channel of the low-side power switch, and a signal on an output terminal of the comparator is adopted to determine the first dead-time to be the first value or the second value.

4. The voltage converter controller of claim 3, wherein the voltage converter circuit is a Buck switching voltage converter, and wherein the high-side power switch is coupled to the input voltage, the low-side power switch is coupled to a ground terminal, and the inductor is coupled to the output voltage.

5. The voltage converter controller of claim 1, wherein the dead-time determining circuit further detects voltages on both sides of the channel of the high-side power switch, and when the power switch controller starts to control the low-side power switch cut-off, if a cross voltage on both sides of the channel of the high-side power switch is smaller than a voltage threshold and the power switch controller does not start to control the high-side power switch conducting, the dead-time determining circuit outputs a signal to inform the power switch controller to start to control the high-side power switch conducting.

6. The voltage converter controller of claim 5, wherein the voltage converter circuit is a Buck switching voltage converter, and wherein the high-side power switch is coupled to the input voltage, the low-side power switch is coupled to a ground terminal, and the inductor is coupled to the output voltage.

7. The voltage converter controller of claim 1, wherein when the power switch controller starts to control the high-side power switch cut-off, after a second dead-time, the power switch controller starts to control the low-side power switch conducting, and wherein if the current on the channel of the low-side power switch conducting in the last time is larger than the current threshold, the second dead-time is determined to be a third value, and wherein if the current on the channel of the low-side power switch conducting in the last time is smaller than the current threshold, the second dead-time is determined to be a fourth value.

8. The voltage converter controller of claim 7, wherein the voltage converter circuit is a Buck switching voltage converter wherein the high-side power switch is coupled to the input voltage, the low-side power switch is coupled to a ground terminal and the inductor is coupled to the output voltage.

9. A voltage converter circuit, comprising:
  a high-side power switch having a channel coupled between a first voltage terminal and a phase terminal;
  a low-side power switch having a channel coupled between a second voltage terminal and the phase terminal;
  an inductor coupled between a third voltage terminal and the phase terminal;
  a pulse-width-modulation (PWM) signal, indicating the conduction and cut-off of the channel of the high-side power switch and the channel of the low-side power switch;
  a power switch controller, receiving the PWM signal whereby the power switch controller outputs a high-side control signal and a low-side control signal, which respectively control the conduction and cut-off of the channel of the high-side power switch and the channel of the low-side power switch, wherein at most one of the channel of the high-side power switch and the channel of the low-side power switch is conducted concurrently, and when the power switch controller starts to control the low-side power switch cut-off, after a first dead-time, the power switch controller starts to control the high-side power switch conducting; and
  a dead-time determining circuit, detecting a current of the conducting channel of the low-side power switch to determine a value of the first dead-time,
    wherein when the current of the conducting channel of the low-side power switch is larger than a current threshold, the first dead-time is determined to be a first value;
    wherein when the current of the conducting channel of the low-side power switch is smaller than the current threshold, the first dead-time is determined to be a second value, and wherein the second value is larger than the first value.

10. The voltage converter circuit of claim 9, wherein the voltage converter circuit is a Buck switching voltage converter, and wherein the first voltage terminal receives an input voltage, the second voltage terminal is a ground terminal, and the third voltage terminal outputs an output voltage.

11. The voltage converter circuit of claim 9, wherein the dead-time determining circuit further comprises a comparator, two input terminals of the comparator are respectively coupled to both sides of the channel of the low-side power switch, and a signal on an output terminal of the comparator is adopted to determine the first dead-time to be the first value or the second value.

12. The voltage converter circuit of claim 11, wherein the voltage converter circuit is a Buck switching voltage converter, and wherein the first voltage terminal receives an input voltage, the second voltage terminal is a ground terminal, and the third voltage terminal outputs an output voltage.

13. The voltage converter circuit of claim 9, wherein the dead-time determining circuit further detects voltages on both sides of the channel of the high-side power switch, and when the power switch controller starts to control the low-side power switch cut-off, if a cross voltage on both sides of the channel of the high-side power switch is smaller than a voltage threshold and the power switch controller does not start to control the high-side power switch conducting, the dead-time determining circuit outputs a signal to inform the power switch controller to start to control the high-side power switch conducting.

14. The voltage converter circuit of claim 13, wherein the voltage converter circuit is a Buck switching voltage converter, and wherein the first voltage terminal receives an input voltage, the second voltage terminal is a ground terminal, and the third voltage terminal outputs an output voltage.

15. The voltage converter circuit of claim 9, wherein when the power switch controller starts to control the high-side power switch cut-off, after a second dead-time, the power switch controller starts to control the low-side power switch conducting, and wherein if the current on the channel of the low-side power switch conducting in the last time is larger than the current threshold, the second dead-time is determined to be a third value, and wherein if the current on the channel of the low-side power switch conducting in the last time is smaller than the current threshold, the second dead-time is determined to be a fourth value.

16. The voltage converter circuit of claim 15, wherein the voltage converter circuit is a Buck switching voltage converter, and wherein the first voltage terminal receives an input voltage, the second voltage terminal is a ground terminal, and the third voltage terminal outputs an output voltage.

* * * * *